US008965917B2

(12) United States Patent
Edara (10) Patent No.: US 8,965,917 B2
(45) Date of Patent: Feb. 24, 2015

(54) OPTIMIZING CELL SEARCH IN A MOBILE COMMUNICATION SYSTEM SUPPORTING VARIABLE CHANNEL BANDWIDTHS (75) Inventor: Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 129 days.

(21) Appl. No.: 13/171,340

(22) Filed: Jun. 28, 2011

(65) Prior Publication Data
US 2013/0007039 A1    Jan. 3, 2013

(51) Int. Cl.
G06F 17/30 (2006.01)
H04W 48/16 (2009.01)
H04W 48/20 (2009.01)

(52) U.S. Cl.
CPC ........... H04W 48/16 (2013.01); G06F 17/3087 (2013.01); H04W 48/20 (2013.01)
USPC ............................. 707/769; 707/790; 455/424

(58) Field of Classification Search
None
See application file for complete search history.

(56) References Cited

U.S. PATENT DOCUMENTS

| | | | | |
|---|---|---|---|---|
| 7,289,807 B2* | 10/2007 | Jaakkola et al. | ........... | 455/435.2 |
| 7,797,018 B2* | 9/2010 | Chandra | ..................... | 455/552.1 |
| 8,090,395 B2* | 1/2012 | Ngai et al. | ..................... | 455/513 |
| 2007/0177584 A1* | 8/2007 | Kubler et al. | ................. | 370/352 |
| 2008/0167052 A1* | 7/2008 | Wang et al. | ................ | 455/456.6 |
| 2009/0036098 A1* | 2/2009 | Lee et al. | ....................... | 455/411 |
| 2009/0156206 A1* | 6/2009 | Rathonyi et al. | .............. | 455/434 |
| 2010/0081433 A1* | 4/2010 | Lee | ................ | 455/434 |
| 2010/0246420 A1* | 9/2010 | Tu et al. | ......................... | 370/252 |
| 2011/0116453 A1* | 5/2011 | Huang et al. | .................. | 370/329 |
| 2011/0117911 A1 | 5/2011 | Narang et al. | | |
| 2011/0235599 A1* | 9/2011 | Nam et al. | .................... | 370/329 |
| 2012/0063340 A1* | 3/2012 | Waters et al. | ................. | 370/252 |
| 2012/0178488 A1* | 7/2012 | Jonker et al. | ................. | 455/517 |
| 2012/0270537 A1* | 10/2012 | Weng et al. | ................... | 455/424 |

FOREIGN PATENT DOCUMENTS

| | | |
|---|---|---|
| WO | 01/62034 | 8/2001 |
| WO | 03/063538 | 7/2003 |

OTHER PUBLICATIONS

Patent Cooperation Treaty International Search Report and Written Opinion mailed Sep. 12, 2012 for PCT Serial No. PCT/US2012/044259, 14 pages.
Lightsquared et al., "Introduction of L-band in TS 36.101," publication, Nov. 8, 2010, 14 pages, Jacksonville, Florida.
International Search Report for PCT Application No. PCT/US2012/044259 dated Jan. 16, 2014, 11 pages.

* cited by examiner

Primary Examiner — Robert Beausoliel, Jr.
Assistant Examiner — Richard Bowen
(74) Attorney, Agent, or Firm — Lowenstein Sandler LLP (57) ABSTRACT Methods and systems for optimizing cell searches in a mobile communication system supporting variable channel bandwidths are disclosed. A user device stores data identifying frequency bands, networks associated with the frequency bands, and various channel bandwidths supported by the networks. The user device is operable to dynamically update the stored data upon detecting a new network associated with one of the frequency bands.

26 Claims, 9 Drawing Sheets

Table 5.7.3-1 E-UTRA channel numbers

| E-UTRA Operating Band | Downlink 710 | | | Uplink | | |
|---|---|---|---|---|---|---|
| | $F_{DL\_low}$ (MHz) 704 | $N_{Offs-DL}$ 706 | Range of $N_{DL}$ 708 | $F_{UL\_low}$ (MHz) 712 | $N_{Offs-UL}$ 714 | Range of $N_{UL}$ 716 |
| 1 | 2110 | 0 | 0 – 599 | 1920 | 18000 | 18000 – 18599 |
| 2 | 1930 | 600 | 600 – 1199 | 1850 | 18600 | 18600 – 19199 |
| 3 | 1805 | 1200 | 1200 – 1949 | 1710 | 19200 | 19200 – 19949 |
| 4 | 2110 | 1950 | 1950 – 2399 | 1710 | 19950 | 19950 – 20399 |
| 5 | 869 | 2400 | 2400 – 2649 | 824 | 20400 | 20400 – 20649 |
| 6 | 875 | 2650 | 2650 – 2749 | 830 | 20650 | 20650 – 20749 |
| 7 | 2620 | 2750 | 2750 – 3449 | 2500 | 20750 | 20750 – 21449 |
| 8 | 925 | 3450 | 3450 – 3799 | 880 | 21450 | 21450 – 21799 |
| 9 | 1844.9 | 3800 | 3800 – 4149 | 1749.9 | 21800 | 21800 – 22149 |
| 10 | 2110 | 4150 | 4150 – 4749 | 1710 | 22150 | 22150 – 22749 |
| 11 | 1475.9 | 4750 | 4750 – 4949 | 1427.9 | 22750 | 22750 – 22949 |
| 12 | 728 | 5000 | 5000 – 5179 | 698 | 23000 | 23000 – 23179 |
| 13 | 746 | 5180 | 5180 – 5279 | 777 | 23180 | 23180 – 23279 |
| 14 | 758 | 5280 | 5280 – 5379 | 788 | 23280 | 23280 – 23379 |
| ... | | | | | | |
| 17 | 734 | 5730 | 5730 – 5849 | 704 | 23730 | 23730 – 23849 |
| ... | | | | | | |
| 33 | 1900 | 36000 | 36000 – 36199 | 1900 | 36000 | 36000 – 36199 |
| 34 | 2010 | 36200 | 36200 – 36349 | 2010 | 36200 | 36200 – 36349 |
| 35 | 1850 | 36350 | 36350 – 36949 | 1850 | 36350 | 36350 – 36949 |
| 36 | 1930 | 36950 | 36950 – 37549 | 1930 | 36950 | 36950 – 37549 |
| 37 | 1910 | 37550 | 37550 – 37749 | 1910 | 37550 | 37550 – 37749 |
| 38 | 2570 | 37750 | 37750 – 38249 | 2570 | 37750 | 37750 – 38249 |
| 39 | 1880 | 38250 | 38250 – 38649 | 1880 | 38250 | 38250 – 38649 |
| 40 | 2300 | 38650 | 38650 – 39649 | 2300 | 38650 | 38650 – 39649 |

NOTE: The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 34, 49, 74 and 99 channel numbers at the upper operating band edge shall not be used for channel bandwidths of 1.4, 3, 5, 10, 15 and 20 MHz respectively.

OPTIMIZING CELL SEARCH IN A MOBILE COMMUNICATION SYSTEM SUPPORTING VARIABLE CHANNEL BANDWIDTHS

BACKGROUND

In today's wireless communication networks, user devices such as electronic book readers, cellular telephones, personal digital assistants (PDAs), portable media players, tablet computers and netbooks typically have to search for cells rather frequently. A cell belongs to a public land mobile network (PLMN) that provides land mobile telecommunications service to user devices. Generally, each service provider operates its own PLMN.

When a user device is first powered on, the user device typically first looks for a cell on which the user device was previously camped on, and if that cell is not found, the user device searches for other cells in the frequency band of the cell on which the user device previously was camped. If such a search does not result in finding a cell, a user device typically starts a cell search procedure that involves scanning all carrier frequencies in the available frequency bands. In addition, a user device performs a cell search after losing service or coverage or as part of a periodic scan for a higher priority PLMN.

Cell selection techniques in Global Systems for Mobile Communications (GSM), Wideband Code-Division Multiple Access (WCDMA) systems and other wireless technologies typically assume a fixed channel bandwidth while searching for suitable cells to camp on. For example, in WCDMA systems, channel bandwidth is always 5 MHz. Hence, when a user device performs a WCDMA cell search, the user device can always use channel bandwidth of 5 MHz regardless of a network operator associated with a specific frequency band.

3GPP Long Term Evaluation (LTE), the latest wireless technology standard developed to support fourth generation (4G) communication systems, defines variable channel bandwidths selectable from 1.4 MHz to 20 MHz with constant subcarrier spacing of 15 kHz. Worldwide Interoperability for Microwave Access (WiMAX), another latest 4G wireless technology defined by 802.16m standards, supports channel bandwidths of 5, 7, 8.75, 10 and 20 MHz. Variable channel bandwidths allow for higher data rates and provide more flexibility to network operators. However, they add extra complexity to cell searches, resulting in longer service acquisition times and increased current drain of user device batteries.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 7 is a table providing details on LTE bands in accordance with 3GPP specification.

DETAILED DESCRIPTION

Methods and systems for optimizing cell searches performed by user devices in a mobile communication system supporting variable channel bandwidths are disclosed. A user device may be any mobile or content rendering device. Examples of such user devices include electronic book readers, cellular telephones, personal digital assistants (PDAs), portable media players, tablet computers, netbooks, and the like. A user device may connect to a network to obtain content from a server or to perform other activity.

A user device stores data identifying frequency bands, various networks associated with the frequency bands, different channel bandwidths supported by the networks, and optionally location data (e.g., GPS coordinates) associated with the individual channel bandwidths supported by the networks. The data can be added to the user device's memory (e.g., non-volatile memory) before the user device is shipped to a user. In addition or alternatively, this data can be added to and/or modified in the user device memory on the fly upon detecting that a channel bandwidth for a network has changed or upon detecting an additional network supporting a specific frequency band. The user device uses the stored data to identify a channel bandwidth that should be used for a cell or network search and performs the search using the identified channel bandwidth.

By maintaining channel bandwidth data, a user device can perform a cell search using a previously verified channel bandwidth, which is likely to result in detection of a proper cell without requiring searches of many additional channels. This leads to improved service acquisition times and reduced current drain of the user device's battery.

Figure 1:
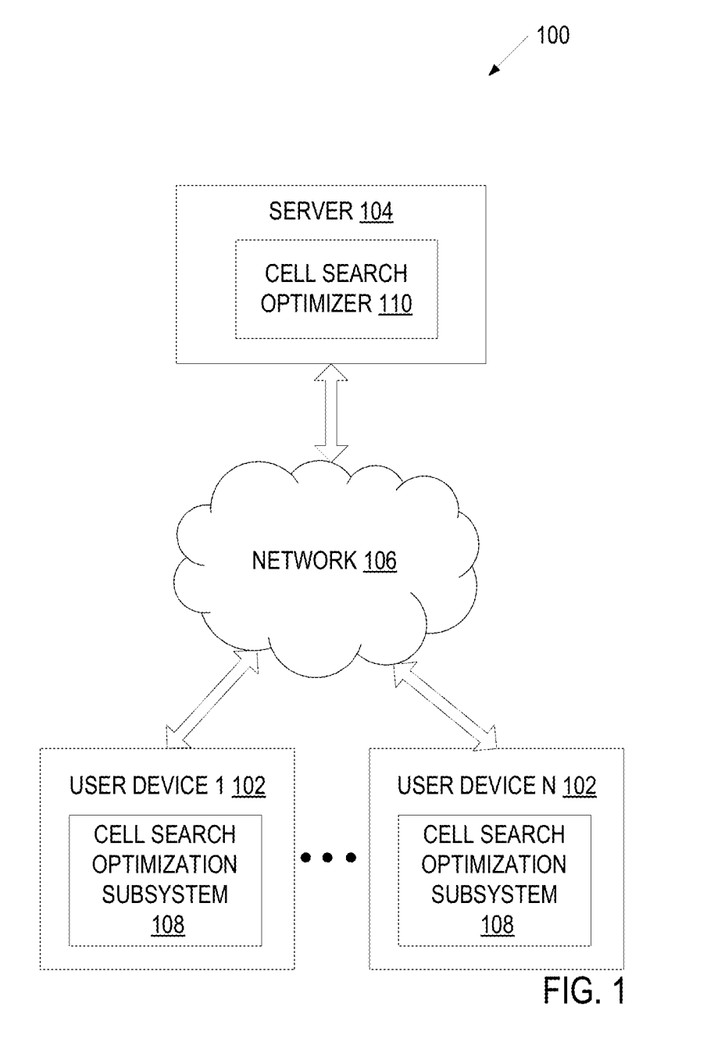
FIG. 1 is a block diagram of an exemplary network architecture in which embodiments of the invention may operate.

FIG. 1 is a block diagram of exemplary network architecture 100 in which embodiments of the invention may operate. The network architecture 100 may include a server 104 and multiple user devices 102 coupled to the server 104 via a network 106 (e.g., public network such as the Internet or private network such as a local area network (LAN)).

The user devices 102 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 104 may be a cloud server, a network operator (service provider) server, a content provider server, an access point provider server, or any other server that provides various services to user devices 102 via the network 106. In one embodiment, the sever 104 downloads items, upgrades, and/or other information to the user devices 102 via the network 106. The server 104 also receives various requests, instructions and other data from the user devices 102 via the network 106. The server 104 may include one or more machines (e.g., one or more server computer systems, routers, gateways) that have processing and storage capabilities to provide the above functionality.

Communication between the server 104 and a user device 102 may be enabled via any communication infrastructure. One example of such an infrastructure includes a combination of a wide area network (WAN) or a VPN and wireless infrastructure, which allows a user to use the user device 102 to purchase items and consume items without being tethered to the server 104 via hardwired links. The wireless infrastructure may be provided by a network operator (service provider) system that can be implemented using various data processing equipment, communication towers, etc. Alternatively, or in addition, the network operator system may rely on satellite technology to exchange information with the user device 102. Yet alternatively, or in combination, the wireless infrastructure may be provided by an access point (e.g., WiFi access point) provider system.

The communication infrastructure may also include a communication-enabling system that serves as an intermediary in passing information between the server 104 and the wireless network operator. The communication-enabling system may communicate with the wireless network operator via a dedicated channel, and may communicate with the server 104 via a non-dedicated communication mechanism, e.g., a public network such as the Internet.

The server 104 may pay the network operator a fee based on the aggregate use of the network operator system by all of the user devices 102. The server 104 may recoup these costs through fees charged to the end-users separately or as part of other purchases (e.g., purchase of digital content) made by the end-users. Alternatively, the network operator may submit bills directly to individual users, or may submits bills to either the server 104 (in aggregate) or to the individual users, at the option of the individual respective users.

A user device 102 may be associated with a specific network operator (service provider) by means of a subscriber identity module (SIM) card. A SIM card may include predefined lists of preferred wireless networks (e.g., PLMNs) that a user device 102 should use when acquiring service outside of the area covered by its own network operator. The lists may also specify frequency bands associated with individual network operators. The entries and prioritization in the lists are usually based on agreements contracted among the various network operators. Alternatively, a user device 102 may be associated with a specific network operator based on data stored in memory (e.g., non-volatile memory), and predefined lists of preferred wireless networks (e.g., PLMNs) with associated frequency bands may also be stored in memory of the user device.

When a user device 102 is powered on, the user device 102 searches for a cell that belongs to its home PLMN in the frequency band supported by the home PLMN. If the user device 102 does not find any cells in that frequency band, the user device 102 searches in other frequency bands supported by the user device 102. The order of selecting frequency bands may be based on preferred network lists in the SIM card or user device memory or it may be based on a separate list stored in the user device memory. The user device 102 may perform similar cell searches as part of exiting an airplane mode or after losing coverage/service. In addition, the user device 102 may perform a cell/PLMN search as part of a periodic higher priority PLMN scan when the user device 102 is camped on a PLMN that is not its home PLMN or the highest priority PLMN.

In a mobile communication system that supports variable channel bandwidths such as an LTE system or a Worldwide Interoperability for Microwave Access (WiMAX) system, a cell search performed by the user device 102 can result in the failure of the user device 102 to detect a proper cell. For example, in the U.S., Verizon® currently uses LTE Band13 with channel bandwidth of 10 MHz; hence if the user device 102 has Verizon's SIM, the user device 102 located in the U.S. will be searching for a cell at 10 MHz channel spacing. However, in another country or another region within the U.S., another network operator may support a different or the same LTE band with channel bandwidth of 5 MHz. If the user device 102 moves to the other country or the other region and continues searching using channel bandwidth of 10 MHz, the user device 102 will fail to detect a cell that belongs to the PLMN of the network operator having channel bandwidth of 5 MHz.

The above problem can be addressed by having the user device 102 always use the smallest possible channel bandwidth when performing a cell search. However, this approach is likely to result in unnecessary searching of many additional channels. For example, LTE supports channel bandwidths of 1.4 MHz, 3 MHz, 5 MHz, 10 MHz, 15 MHz and 20 MHz, with the smallest channel bandwidth being 1.4 MHz. If the user device 102 is in the area in the U.S. that is covered by Verizon LTE, the user device 102 would be performing cell searches at 1.4 MHz spacing even though Verizon has configured cells using 10 MHz spacing.

Embodiments of the invention avoid the above limitations by storing channel bandwidth data in a local store (e.g., in non-volatile memory) of the user device 102. In particular, the user device 102 may host a cell search optimization subsystem 108 that stores data identifying frequency bands, various networks associated with the frequency bands, different channel bandwidths supported by the networks, and optionally location data (e.g., GPS coordinates) associated with the individual channel bandwidths supported by the networks. This data can be added to the user device's memory (e.g., non-volatile memory) before the user device 102 is shipped to a user. In addition or alternatively, the cell search optimization subsystem 108 can add and/or modified this data on the fly upon detecting that a channel bandwidth for a network has changed or upon detecting an additional network supporting a specific frequency band. The cell search optimization subsystem 108 uses the stored data to identify a channel bandwidth that should be used for a cell or network (PLMN) search and performs the search using the identified channel bandwidth. In one embodiment, the cell search optimization subsystem 108 skips searching for specific channel numbers on a given band when performing the search. Alternatively, the cell search optimization subsystem 108 does not skip searching for any channel numbers to ensure that it does not miss detecting any cells if the network uses lower channel bandwidths.

In one embodiment, the server 104 hosts a cell search optimizer 110 that collects channel bandwidth data from various user devices 102, stores it in a centralized data store and periodically provides it to the user devices 102. The cell search optimizer 110 may provide this data to user devices 102 upon receiving requests from individual user devices 102 or upon determining that the data has changed.

Figure 2:
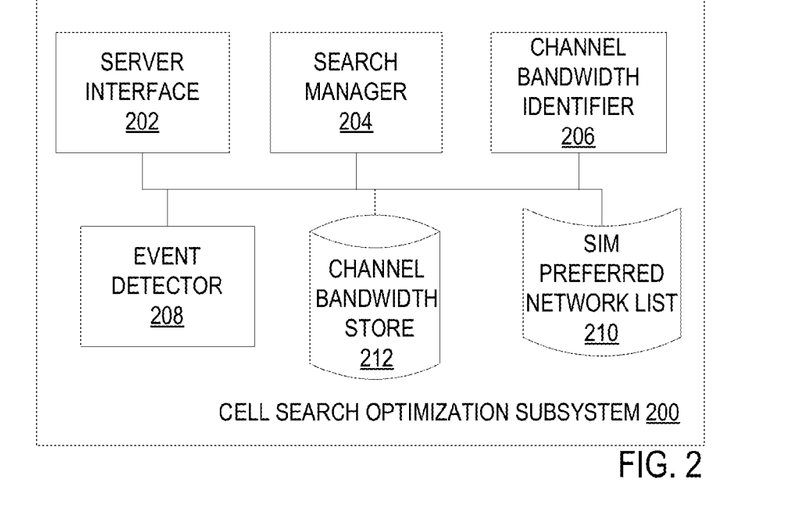
FIG. 2 is a block diagram of one embodiment of a cell search optimization subsystem.

FIG. 2 is a block diagram of one embodiment of a cell search optimization subsystem 200 hosted by a user device. The cell search optimization subsystem 200 may be the same as cell search optimization subsystem 108 of FIG. 1 and may include a server interface 202, a search manager 204, a channel bandwidth identifier 206, an event detector 208, a SIM preferred network list 210 and channel bandwidth store 212. The components of the cell search optimization subsystem 200 may represent modules that can be combined together or separated into further modules, according to some embodiments.

The user device may include a SIM card that associates the user device with a specific network operator and stores predefined lists of preferred networks (e.g., SIM preferred network list(s) 210) that the user device should use when performing a preferred network scan on a network that is not its home network or the highest priority network. The SIM card may also store a frequency band associated with each network. Alternatively, data associating the user device with a specific network operator, preferred network lists and corresponding frequency bands may be stored in non-volatile memory of the user device. Yet alternatively, the non-volatile memory of the user device may store a separate list specifying the order of frequency bands that should be used when performing a cell/network search.

The channel bandwidth store 212 stores data identifying frequency bands, various networks associated with the frequency bands, and different channel bandwidths supported by the networks. Each network may be uniquely identified using a mobile country code (MCC) and a mobile network code (MNC). In addition, the channel bandwidth store 212 may store one or more frequencies associated with each network. Further, the channel bandwidth store 212 may store location data (e.g., GPS coordinates) associated with the individual channel bandwidths supported by the networks. Contents of the channel bandwidth store 212 may be added before the user device is shipped to a user. Alternatively or in addition, contents of the channel bandwidth store 212 may be added and/or updated dynamically when detecting a new network supporting a specific frequency band or detecting that a channel bandwidth used by an existing network has changed.

The event detector 208 is responsible for detecting new search events. These events may include, for example, a power-on event, loss of service or coverage by the last registered network, exiting an airplane mode, or a periodic scan for a higher priority network. In one embodiment, upon detecting a new network event, the event detector 208 invokes the search manager 204 to perform a search for a cell or network.

The search manager 204 may first identify a current country and/or region. The search manager 204 may identify the current country upon finding a PLMN (home or any other PLMN) on any radio access technology when the user device is powered on or during an out of service search, and receiving the MCC of the found PLMN. Alternatively, the search manager 204 may identify the current country and/or region by requesting GPS coordinates from a GPS subsystem data if the user device hosts a GPS subsystem and it is turned on. Yet alternatively, if the user device includes a WiFi adapter and it is turned on, the search manager 204 can identify the location of the closest WiFi hotspot and determine the current country and/or region based on this location. Still alternatively, if the search manager 204 knows which PLMN it is looking for (e.g., home PLMN, last registered PLMN or a PLMN from a PLMN priority list in the SIM card or non-volatile memory), the search manager 204 can find the country and/or region associated with this PLMN using data stored in a local database.

The search manager 204 may also identify a frequency band in which to perform a search for a cell or network based on the frequency band associated with the home network or a frequency band priority list stored in non-volatile memory or as a part of the SIM preferred network list 210. The search manager 204 may then search the channel bandwidth store 212 for records including the identified country and the identified frequency band. If a matching record is found, the search manager 204 uses a channel bandwidth specified in the record to perform a search. If a matching record is not found, the search manager 204 may perform a search using a first channel bandwidth and if it does not result in finding a cell or network, the search manager may repeat the search using other channel bandwidths until finding a cell. The channel bandwidths to be used and their order may be provided by the channel bandwidth identifier 206. For example, the channel bandwidth identifier 206 may provide the channel bandwidths supported by the mobile communication system (e.g., LTE or WiMAX system) in an ascending order starting with the lowest channel bandwidth or a descending order starting with the highest channel bandwidth. Alternatively, the channel bandwidth identifier 206 may determine usage frequency or "popularity" of each channel bandwidth and provide the channel bandwidths in the order defined by their popularity, starting with the channel bandwidth that is most frequently used across different networks (e.g., in a specific country).

Upon finding a cell, the search manager 204 determines a channel bandwidth corresponding to the found cell. In one embodiment, the channel bandwidth is determined based on a master information block that is broadcast by the network operator on the entire cell. The search manager 204 may then add a record including the network identifier (e.g., MCC and MNC), band, frequency and channel bandwidth to the channel bandwidth store 212.

The server interface 202 is responsible for providing new or updated records from the channel bandwidth store 212 to the server. In addition, the server interface 202 may receive from the server channel bandwidth data collected by other user devices and may update the contents of the channel bandwidth store 212 based on the received data.

The channel bandwidth store 212 may represent a single data structure or multiple data structures (tables, databases, repositories, files, etc.) residing on one or more mass storage devices, such as magnetic or optical storage based disks, solid-state drives or hard drives. In one embodiment, when the channel bandwidth store 212 reaches a certain size, new records are added by replacing the oldest records in the channel bandwidth store 212.

Figure 3:
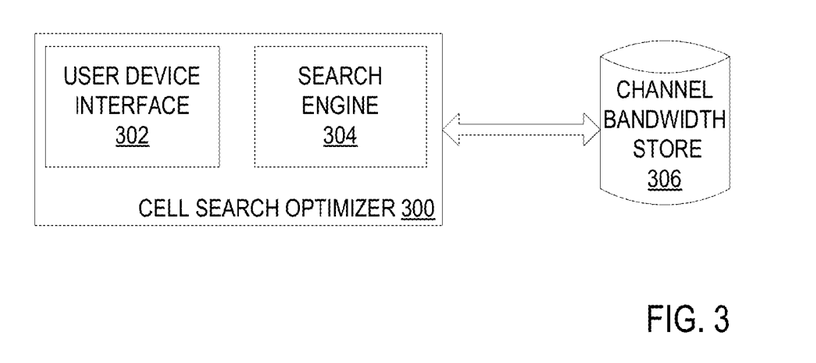
FIG. 3 is a block diagram of one embodiment of a cell search optimizer

FIG. 3 is a block diagram of one embodiment of a cell search optimizer 300 hosted by a server. The cell search optimizer 300 may be the same as cell search optimizer 110 of FIG. 1. The cell search optimizer 300 may include a user device interface 302, a search engine 304, and a channel bandwidth store 306. The components of the cell search optimizer 300 may represent modules that can be combined together or separated into further modules, according to some embodiments.

The user device interface 302 receives channel bandwidth records from various user devices and stores these records in the channel bandwidth store 306. A channel bandwidth record may include a network identifier (e.g., a combination of MCC and MNC), a band supported by the network, one or more frequencies associated with the network, one or more channel bandwidths used by the network, and optionally location data associated with individual frequencies supported by the network. In addition, the user device interface 302 may periodically provide channel bandwidth records to user devices (e.g., in response to user device requests or upon detecting a change in the contents of the channel bandwidth store 306). In one embodiment, the user device interface 302 may receive a user device request for specific records (e.g., records associated with a certain MCC and/or network or records associated with specific channel bandwidths). In response to such a request, the user device interface invokes the search engine 304 to find the requested records in the channel bandwidth store 306, and then provides the requested records to the user device.

The channel bandwidth store 306 may represent a single data structure or multiple data structures (tables, databases, repositories, files, etc.) residing on one or more mass storage devices, such as magnetic or optical storage based disks, solid-state drives or hard drives.

Figure 4:
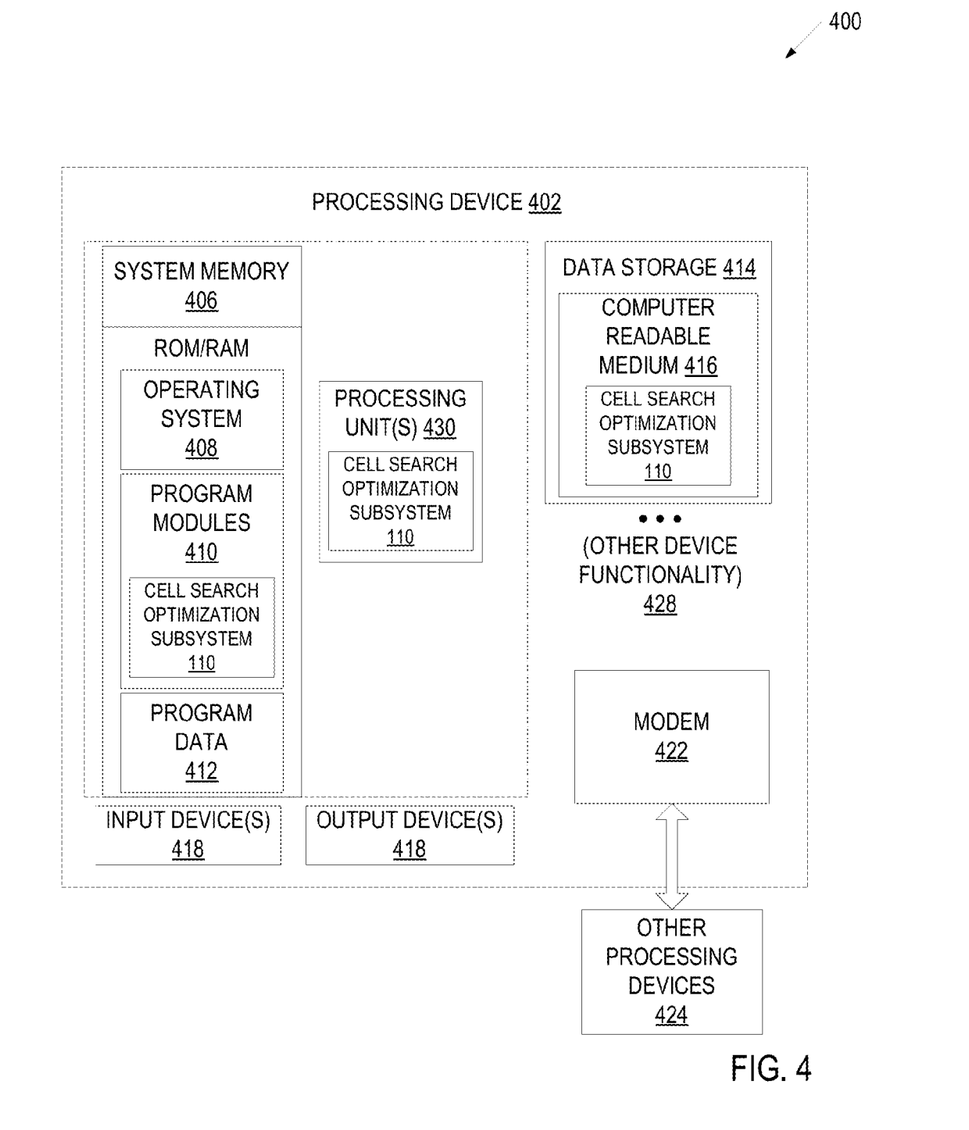
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including cell search optimization subsystem 108, program data 412, and/or other components. The user device 400 performs functions by using the processing unit(s) 404 to execute the preferred network subsystem 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the cell search optimization subsystem 108) embodying any one or more of the methodologies or functions described herein. As shown, instructions of the cell search optimization subsystem 108 may also reside, completely or at least partially, within the system memory 406 and/or within the processing unit(s) 430 during execution thereof by the user device 400, the system memory 406 and the processing unit(s) 430 also constituting computer-readable media. The instructions of the cell search optimization subsystem 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as remote computers, the server 104, and so forth. The wireless modem 422 may allow the user device 400 to receive a telephone ring and also communicate with the server 104 in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 400. As indicated by the label "Other Device Functionality" 428, the user device 400 may include additional functions.

Figure 5:
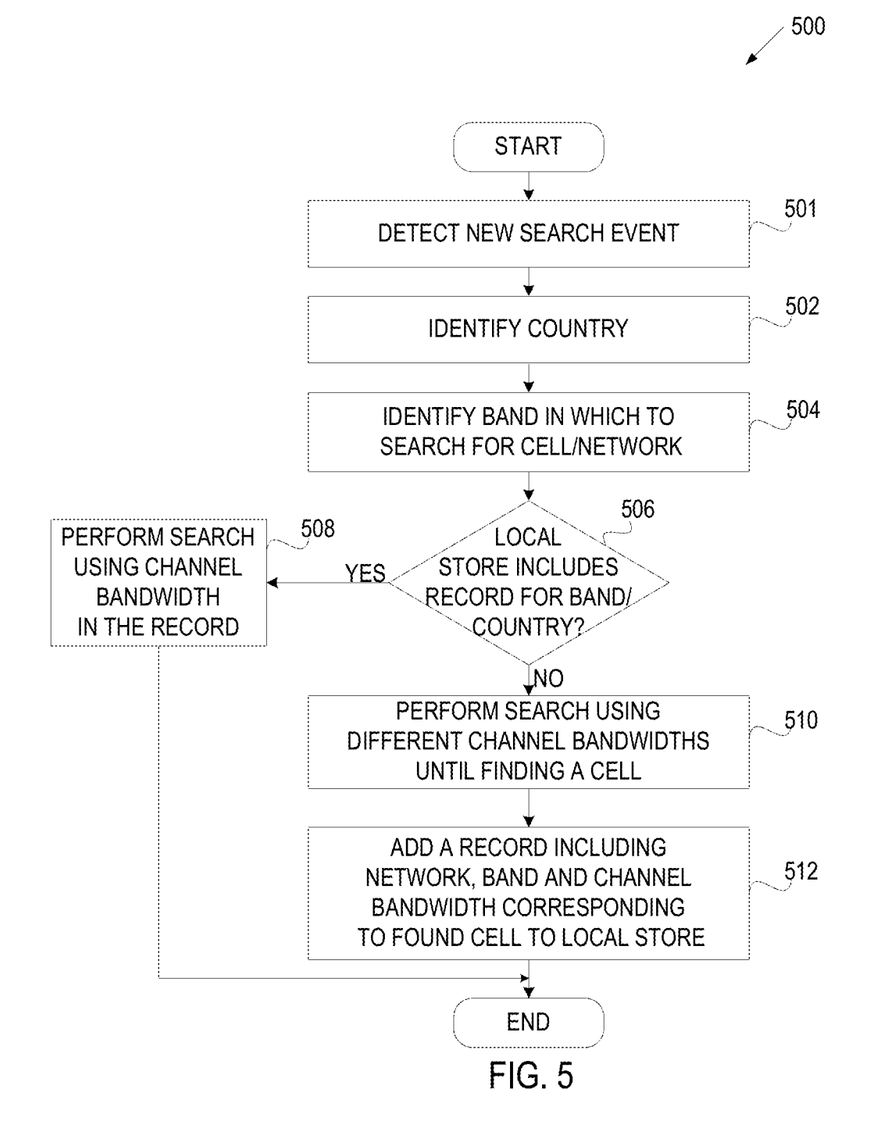
FIG. 5 is a flow diagram of one embodiment of a method for optimizing a search for a cell or network in a mobile communication system supporting variable channel bandwidths.
Figure 6:
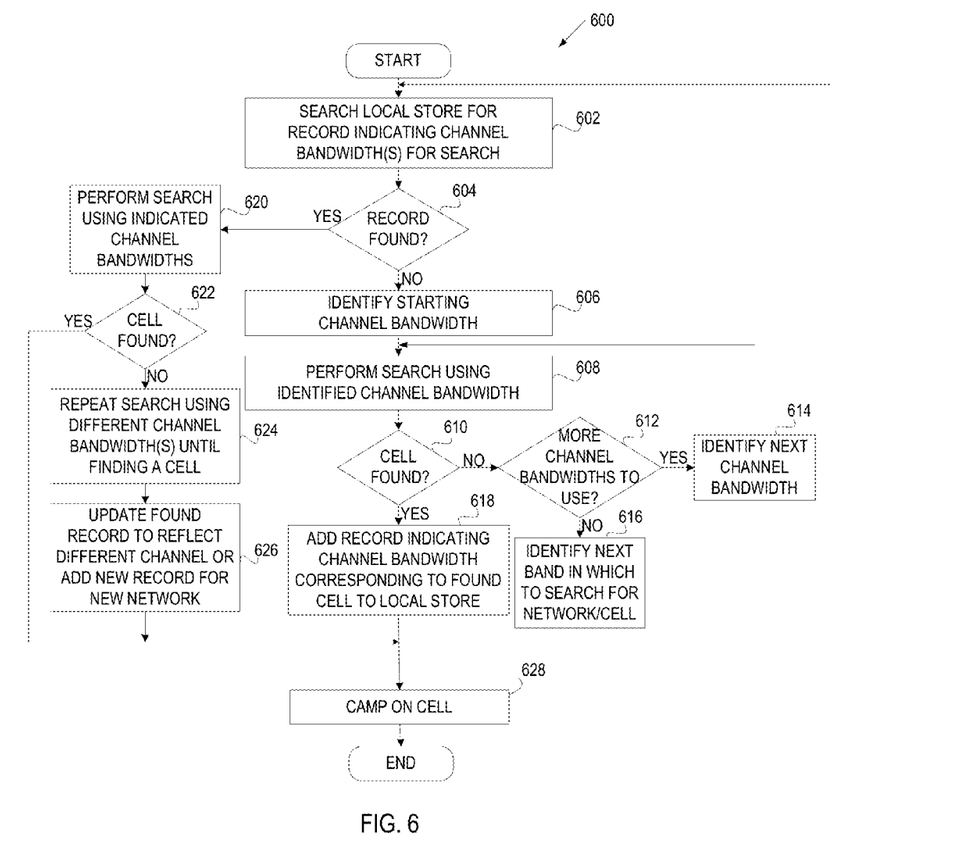
FIG. 6 is a flow diagram of one embodiment of a method for dynamically updating channel bandwidth records in a local data store.
Figure 8:
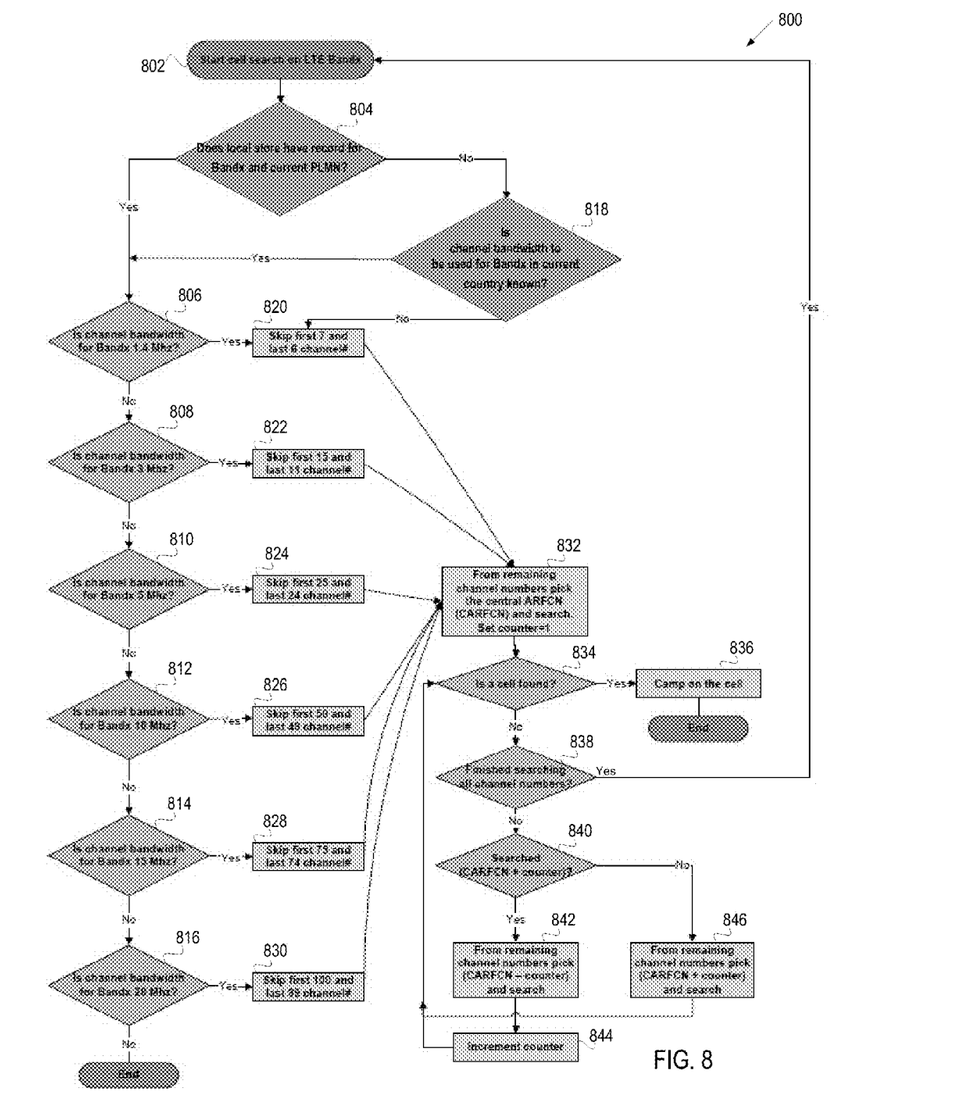
FIG. 8 is a flow diagram of one embodiment of a method for performing an LTE cell search.

FIGS. 5, 6 and 8 are flow diagrams of some embodiments of client-side methods. The methods are performed by processing logic that may comprise hardware (circuitry, dedicated logic, etc.), software (such as is run on a general purpose computer system or a dedicated machine), or a combination of both. In one embodiment, embodiments of the methods are performed by a user device (e.g., a cell search optimization subsystem 108 of user device 102 of FIG. 1).

FIG. 5 is a flow diagram of one embodiment of a method 500 for optimizing a search for a cell or network in a mobile communication system supporting variable channel bandwidths. At block 501, the user device detects a new search event, which may be a power-on event, loss of service or coverage, an airplane mode exit or a periodic higher priority network scan. At block 502, the user device identifies a current country and/or region. The user may identify the current country upon finding a PLMN (home or any other PLMN) on any radio access technology when the user device is powered on or during an out of service search, and receiving the MCC of the found PLMN. Alternatively, the user device may identify the current country and/or region by requesting GPS coordinates from a GPS subsystem if the user device hosts a GPS subsystem and it is turned on. Yet alternatively, if the user device includes a WiFi adapter and it is turned on, the user device can identify the location of the closest WiFi hotspot and determine the current country and/or region based on this location. Still alternatively, if the user device knows which PLMN it is looking for (e.g., home PLMN, last registered PLMN or a PLMN from a PLMN priority list in the SIM card or non-volatile memory), the user device can find the country and/or region associated with this PLMN using data stored in a local database.

At block 504, the user device identifies a frequency band in which a search for a cell or network should be performed. At block 506, the user device searches a local store for a record matching the combination of the MCC and the frequency band and determines whether the local store includes the matching record. If so, the user device performs a search using the channel bandwidth specified in the record (block 508). If not, the user device performs a search using different channel bandwidths until finding a cell (block 510), determines a channel bandwidth corresponding to the found cell (e.g., using the master information block that is broadcast on the found cell), and adds to the local store a record including the network identifier (the MCC and MNC), the band and frequency associated with the network identifier, and the channel bandwidth corresponding to the found cell. In one embodiment, the user device may also determine the current location of the user device and add this location data to the record.

FIG. 6 is a flow diagram of one embodiment of a method 600 for dynamically updating a local channel bandwidth store. At block 602, the user device searches the local store for a record indicating a channel bandwidth for a cell scan. If such a record is found (block 604), the user device performs a search using the indicated channel bandwidth(s) (block 620). If the search results in detecting a cell, the user device camps on the detected cell (block 628). If the search does not result in detecting a cell, then the channel bandwidth for this network has been changed, and the user device repeats the search using different channel bandwidth(s) until finding a cell (block 624). The user device may find a cell that belongs to the network with which the user has been previously registered or it may find a cell that belongs to a different network which is not specified in the local channel bandwidth store. The user device then updates the corresponding record in the local channel bandwidth store to reflect the change in the channel bandwidth or adds a record for a new network to the local channel bandwidth store (block 626). At block 628, the user device camps on the detected cell.

If the user device does not find a matching record in the local channel bandwidth store at block 604, the user device identifies a starting channel bandwidth for performing a cell or network search (block 606). The starting channel bandwidth may be the lowest or highest channel bandwidth supported by the user device, or it may be a channel bandwidth that is most frequently used across different networks (e.g., in a given country) as may be determined using the contents of the local channel bandwidth store or statistics collected over a predefined period of time by a server or the user device.

At block 608, the user device performs a search for a cell or network using the identified channel bandwidth. If a cell is detected (block 610), the user device adds to the local channel bandwidth store a record indicating a channel bandwidth corresponding to the detected cell (block 618) and camps on the detected cell (block 628). If a cell is not detected at block 610, the user device determines whether the current frequency band supports other channel bandwidths (block 612). If not, the user device identifies a next frequency band in which a cell or network search should be performed (block 616) and the method returns to block 602. If so, the user device identifies a next channel bandwidth that should be used for the search (block 614) and the method returns to block 608.

FIG. 7 illustrates a table 700 that provides details on LTE bands. The table 700 represents Table 5.7.3-1 entitled "E-UTRA channel numbers" in 3GPP Specification 36.101. The table 700 includes column 702 that lists LTE bands referred to as E-UTRA (Evolved Universal Terrestrial Radio Access) Operating Bands. As shown, LTE supports 40 frequency bands. Sections 710 and 720 provide information for the uplink and the downlink respectively. Columns 704 and 712 specify low frequencies for given bands for the uplink and downlink respectively. Columns 706 and 714 specify frequency offsets for given bands for the uplink and downlink respectively. Columns 708 and 716 specify a range of channel numbers (referred to as E-UTRA Absolute Radio Frequency Channel Number (EARFCN)) for given bands for the uplink and downlink respectively.

As specified in Note 722, certain channel numbers can be skipped when performing a cell search using a particular channel bandwidth. Specifically, for channel bandwidth of 1.4 MHz, the first 7 channel numbers at the lower operating band edge and the last 6 channel numbers at the upper operating band edge can be skipped; for channel bandwidth of 3 MHz, the first 15 channel numbers at the lower operating band edge and the last 14 channel numbers at the upper operating band edge can be skipped; for channel bandwidth of 5 MHz, the first 25 channel numbers at the lower operating band edge and the last 24 channel numbers at the upper operating band edge can be skipped; for channel bandwidth of 10 MHz, the first 50 channel numbers at the lower operating band edge and the last 49 channel numbers at the upper operating band edge can be skipped; for channel bandwidth of 15 MHz, the first 75 channel numbers at the lower operating band edge and the last 74 channel numbers at the upper operating band edge can be skipped; and for channel bandwidth of 20 MHz, the first 100 channel numbers at the lower operating band edge and the last 99 channel numbers at the upper operating band edge can be skipped.

FIG. 8 is a flow diagram of one embodiment of a method 800 for performing an LTE cell search. At block 802, the user device starts a cell search on a certain LTE band ("Bandx"). At block 804, the user device determines whether a record specifying a channel bandwidth for the current PLMN and Bandx is present in the local store. If so, the user device identifies a channel bandwidth to be used and skips a predefined sequence of channel numbers as defined for this channel bandwidth in the specification (e.g., 3GPP specification 36.101, Section 5.7.3). In particular, if the channel bandwidth is 1.4 MHz (block 806), the user device skips the first 7 channel numbers at the lower operating band edge and the last 6 channel numbers at the upper operating band edge, and proceeds to block 832. If the channel bandwidth is 3 MHz, the user device skips the first 15 channel numbers at the lower operating band edge and the last 14 channel numbers at the upper operating band edge, and proceeds to block 832. If the channel bandwidth is 5 MHz, the user device skips the first 25 channel numbers at the lower operating band edge and the last 24 channel numbers at the upper operating band edge, and proceeds to block 832. If the channel bandwidth is 10 MHz, the user device skips the first 50 channel numbers at the lower operating band edge and the last 49 channel numbers at the upper operating band edge, and proceeds to block 832. If the channel bandwidth is 15 MHz, the user device skips the first 75 channel numbers at the lower operating band edge and the last 74 channel numbers at the upper operating band edge, and proceeds to block 832. Lastly, if the channel bandwidth is 20 MHz, the user device skips the first 100 channel numbers at the lower operating band edge and the last 99 channel numbers at the upper operating band edge, and proceeds to block 832.

At block 832, the user device selects the central channel number (central ARFCN (CARFCN)) from the remaining channel numbers, sets the counter to 1, and performs a cell search. If a cell is found (block 834), the user device camps on the cell (block 836). If not, the user device determines whether it has finished searching all channel numbers of Bandx (block 838). If the user device has finished searching the channel numbers of Bandx, the user device moves to the next band and the method returns to block 802.

If the user has not finished searching the channel numbers of Bandx, the user device determines whether it already searched the channel number equal to CARFCN plus the current counter (block 840). If not, the user device performs a search of the channel number equal to CARFCN plus the current counter (block 846) and the method returns to block 834. If so, the user device selects from the remaining channel numbers the channel number equal to CARFCN minus the current counter and performs the search (block 842). The user device then increments the counter (block 844) and the method returns to block 834. It should be noted that the use of CARFCN is not necessary and various other mechanisms can be used to continue searching the remaining channel numbers.

Returning to block 804, if the user device does not find a matching record in the local store, the user device determines whether the channel bandwidth to be used for Bandx in the current country is known from prior searches for 3G/2G cells, where the prior search results may be stored in a local data store (block 818). As discussed above, the current country may be identified by searching for a PLMN (home or any other PLMN) on any radio access technology when the user device is powered on or during an out of service search, and receiving the MCC of the found PLMN. Alternatively, the current country can be identified by requesting GPS coordinates from a GPS subsystem data if the user device hosts a GPS subsystem and it is turned on. Yet alternatively, if the user device includes a WiFi adapter and it is turned on, the current country can be identified using the location of the closest WiFi hotspot. Still alternatively, if the user device knows which PLMN it is looking for (e.g., home PLMN, last registered PLMN or a PLMN from a PLMN priority list in the SIM card or non-volatile memory), the current country can be identified using data stored in a local database for this PLMN.

If the channel bandwidth to be used for Bandx in the current country is known, the method proceeds to block 806 and continues with the path associated with the known channel bandwidth. If the channel bandwidth to be used for Bandx in the current country is unknown, the user device starts the search with the lowest channel bandwidth at block 820.

Figure 9:
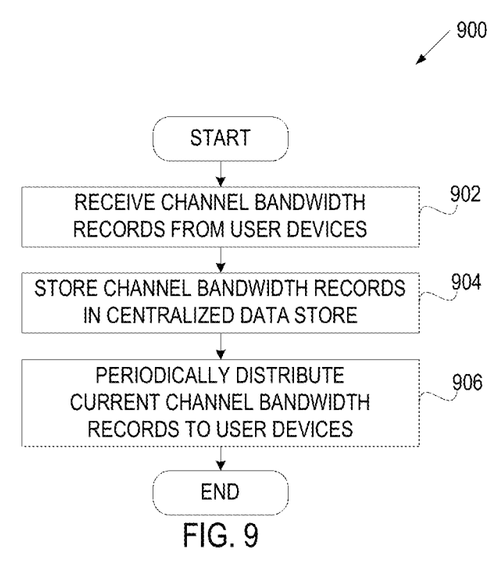
FIG. 9 is a flow diagram of one embodiment of a server-side method for assisting in cell or network searches.

FIG. 9 is a diagram of one embodiment of a server-side method 900 for assisting in cell or network searches. The method is performed by processing logic that may comprise hardware (circuitry, dedicated logic, etc.), software (such as is run on a general purpose computer system or a dedicated machine), or a combination of both. In one embodiment, the method is performed by a server (e.g., a cell search optimizer 110 of a server 104 of FIG. 1).

Referring to FIG. 9, method 900 begins with a server receiving channel bandwidth records from user devices (block 902) and storing the channel bandwidth records in a centralized data store (block 904). A channel bandwidth record may include a network identifier (e.g., a combination of MCC and MNC), a band supported by the network, one or more frequencies associated with the network, one or more channel bandwidths used by the network, and optionally location data associated with the individual channel bandwidths used by the network.

The server periodically provides channel bandwidth records to user devices (block 906). The server may provide channel bandwidth records in response to user device requests or upon detecting a change in the contents of the centralized data store. In one embodiment, the server receives a user device request for specific records (e.g., records associated with a certain MCC and/or network or records associated with specific channel bandwidths), looks for the requested records in the centralized data store, and then provides the requested records to the user device.

Figure 10:
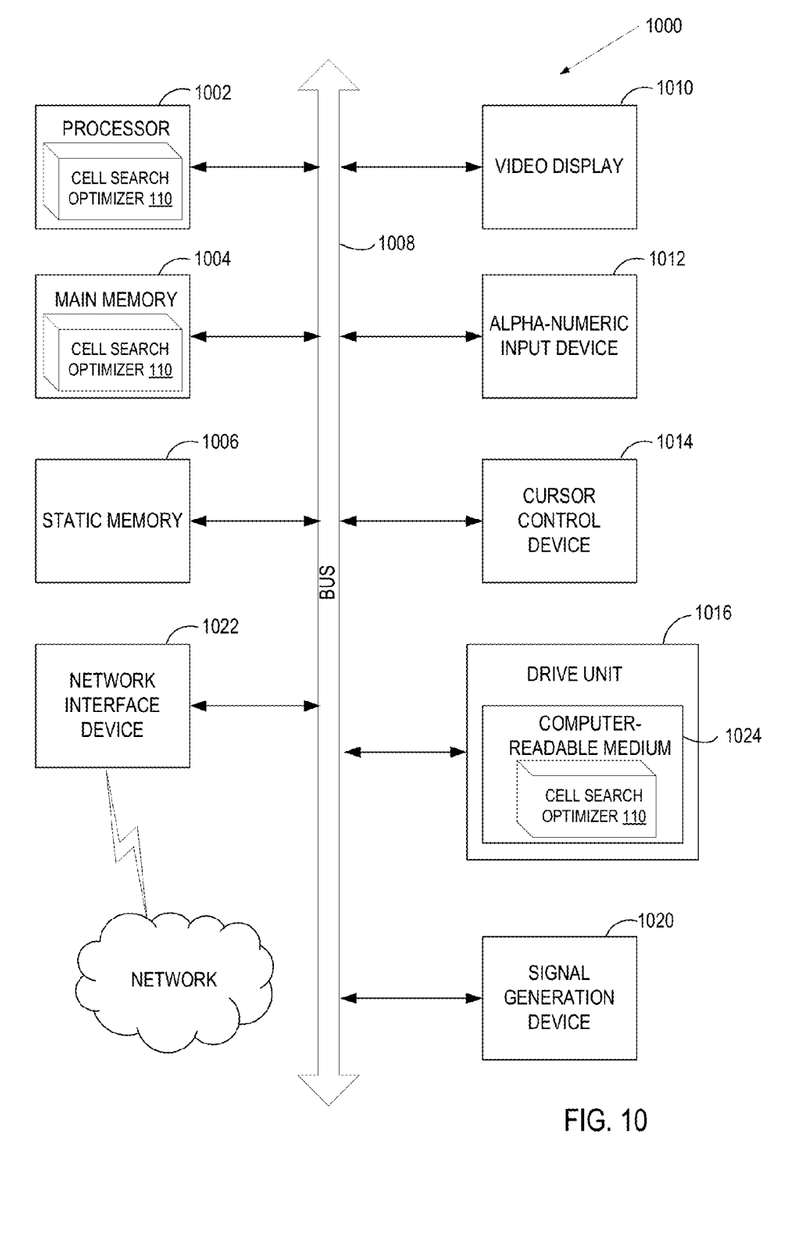
FIG. 10 illustrates an exemplary server assisting in cell or network searches.

FIG. 10 illustrates an exemplary server 1000 that assists in preferred network scans. The server 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1006.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the preferred network manager 110 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a computer-readable medium 1024 on which is stored one or more sets of instructions (e.g., instructions of cell search optimizer 110) embodying any one or more of the methodologies or functions described herein. The cell search optimizer 110 may also reside, completely or at least partially, within the main memory 1004 and/or within the processor 1002 during execution thereof by the computer system 1000, the main memory 1004 and the processor 1002 also constituting computer-readable media. The cell search optimizer 110 may further be transmitted or received over a network 1020 via the network interface device 1022.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a selfconsistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   detecting a new search event for a user device operating in a mobile communications system supporting a plurality of channel bandwidths;
   identifying a frequency band in which to perform a search for a cell or a network at a present location of the user device;
   searching a local data store of the user device for data indicating one or more of the plurality of channel bandwidths for the present location of the user device;
   when the local data store includes the data indicating one or more of the plurality of channel bandwidths, performing the search using the indicated channel bandwidths;
   when the local data store does not include the data indicating one or more of the plurality of channel bandwidths, performing the search based on the present location of the user device using different channel bandwidths of the plurality of channel bandwidths until finding a cell at a particular channel bandwidth, and storing data indicating the particular channel bandwidth corresponding to the found cell in the local data store; and
   sending the data indicating the particular channel bandwidth corresponding to the found cell to a server to maintain a record in a centralized data store.

2. The method of claim 1 wherein the new search event comprises at least one of a power-on event, a network change, an airplane mode exit, a reacquisition of lost service, or a reacquisition of lost coverage.

3. The method of claim 1 wherein the data indicating one or more of the plurality of channel bandwidths for the search comprises at least one of an identifier of the network at the present location of the user device, the band associated with the network, one or more channel bandwidths to be used by the network at the present location of the user device, or location data associated with the channel bandwidths.

4. The method of claim 1 wherein the different channel bandwidths are selected from a set of predefined channel bandwidths in an ascending order, starting with the lowest channel bandwidth in the set.

5. The method of claim 1 wherein the different channel bandwidths are selected from a set of predefined channel bandwidths based on a usage probability associated with predefined channel bandwidths in the set, starting with the most frequently used channel bandwidth in the set.

6. The method of claim 1 wherein performing the search using different channel bandwidths of the plurality of channel bandwidths comprises:
   for each of the different channel bandwidths, skipping a predefined number of channels when performing the search.

7. The method of claim 1 wherein the server is any one of a cloud server, a service provider server, or a content provider server.

8. The method of claim 1 further comprising:
   receiving, from the server, data indicating a channel bandwidth corresponding to a cell found by a different user device at a specified location; and
   updating the local data store with the received data.

9. The method of claim 1 further comprising:
   identifying a new channel bandwidth used by the network; and
   updating the local data store with data indicating the new channel bandwidth.

10. The method of claim 1 further comprising:
    identifying a new network associated with the band;
    identifying a channel bandwidth used by the new network; and
    adding a record for the new network to the local data store, the record specifying the new network, the associated band, and the channel bandwidth used for the band.

11. A computer-implemented method for a server comprising:
    receiving channel bandwidth data records from a plurality of user devices, wherein a channel bandwidth data record identifies a frequency band of a cell found by a mobile device, one or more networks associated with the frequency band, and a plurality of channel bandwidths supported by the one or more networks identified by one or more searches performed by the mobile device using different channel bandwidths of the plurality of channel bandwidths until finding one or more cells at one or more particular channel bandwidths;

storing the received channel bandwidth data records comprising the one or more particular channel bandwidths corresponding to the one or more cells in a centralized data store; and periodically sending current channel bandwidth data records to the plurality of user devices.

12. The method of claim 11 wherein periodically sending current channel bandwidth data records to the plurality of user devices comprises:

determining that content of the centralized data store has changed; and sending changed content to the plurality of user devices.

13. The method of claim 11 wherein periodically sending current channel bandwidth data records to the plurality of user devices comprises:

receiving a request for one or more channel bandwidth data records from a user device; and sending the requested channel bandwidth data records to the user device.

14. A user device comprising:

memory to store data identifying a plurality of frequency bands, a plurality of networks associated with the plurality of frequency bands, and a plurality of channel bandwidths supported by the plurality of networks; and a processing device, coupled to the memory, to update the stored data with a new record corresponding to channel bandwidths associated with the cells that are not in the stored data upon detecting a new network associated with one of the plurality of frequency bands and send the updated stored data to a server to maintain a record in a centralized data store, wherein when the stored data does not include data indicating one or more of the plurality of channel bandwidths for the present location of the user device, perform a search using different channel bandwidths until finding a cell at a particular channel bandwidth, and add a record indicating the particular channel bandwidth corresponding to the found cell to the stored data.

15. The user device of claim 14 wherein the memory is further to store location data associated with individual channel bandwidths supported by corresponding networks.

16. The user device of claim 14 wherein the processing device is further to:

detect a new search event;

identify one of the plurality of frequency bands in which to perform a search for a cell or a network;

identify a current country of the user device;

search the stored data for a record having a frequency band matching the identified frequency band and a country matching the identified country; and when the local data store includes the record having the matching frequency band and the matching country, perform the search using one or more channel bandwidths in the record.

17. The user device of claim 16 wherein the new search event comprises at least one of a power-on event, a network change, an airplane mode exit, a reacquisition of lost service, or a reacquisition of lost coverage.

18. The user device of claim 16 wherein the different channel bandwidths are selected from a set of predefined channel bandwidths in an ascending order, starting with the lowest channel bandwidth in the set.

19. The user device of claim 16 wherein the different channel bandwidths are selected from a set of predefined channel bandwidths based on a usage probability associated with predefined channel bandwidths in the set, starting with the most frequently used channel bandwidth in the set.

20. The user device of claim 16 wherein the processing device is to perform the search using different channel bandwidths by skipping a predefined number of channels when performing the search for each of the different channel bandwidths.

21. The user device of claim 14 wherein the processing device is further to:

receive, from the server, a record corresponding to a cell found by a different user device at a specified location; and update the stored data with the received record.

22. A non-transitory computer readable storage medium including instructions that, when executed by a processing system, cause the processing system to perform operations, comprising:

maintaining, in a local store of a user device, data identifying a plurality of frequency bands, a plurality of networks associated with the plurality of frequency bands, and a plurality of channel bandwidths supported by the plurality of networks, wherein the data is updated with new records corresponding to channel bandwidths of cells that are not in the stored data;

determining that the local store does not include a record for the network at the present location of the user device;

performing a search using different channel bandwidths supported by the network at a present location of the user device until finding a cell at a particular channel bandwidth;

adding a record specifying the particular channel bandwidth corresponding to the found cell to the local store; and sending the data indicating the particular channel bandwidth corresponding to the found cell to a server to maintain a record in a centralized data store.

23. The computer readable storage medium of claim 22 wherein the local store further comprises location data associated with individual channel bandwidths supported by the networks.

24. The computer readable storage medium of claim 22 wherein the different channel bandwidths are selected from a set of predefined channel bandwidths in an ascending order, starting with the lowest channel bandwidth in the set.

25. The computer readable storage medium of claim 22 wherein the different channel bandwidths are selected from a set of predefined channel bandwidths based on a usage probability associated with predefined channel bandwidths in the set, starting with the most frequently used channel bandwidth in the set.

26. The computer readable storage medium of claim 22 wherein performing the search using different channel bandwidths comprises:

for each of the different channel bandwidths, skipping a predefined number of channels when performing the search.

* * * * *